United States Patent

[11] 3,599,710

| [72] | Inventor | Donald N. Joslin<br>Elyria, Ohio |
|---|---|---|
| [21] | Appl. No. | 869,302 |
| [22] | Filed | Oct. 24, 1969 |
| [45] | Patented | Aug. 17, 1971 |
| [73] | Assignee | American Standard Inc.<br>New York, N.Y. |

[54] RELAY-TYPE CONTROL FOR AIR CONDITIONER
8 Claims, 7 Drawing Figs.

[52] U.S. Cl. .................................................. 165/26,
236/11
[51] Int. Cl. ........................................................ F25b 29/00
[50] Field of Search ............................................ 165/26, 27,
28, 48, 76; 236/11

[56] References Cited
UNITED STATES PATENTS

| 3,228,458 | 1/1966 | Brown .......................... | 165/26 |
| 3,544,003 | 12/1970 | Bissell .......................... | 236/11 |

Primary Examiner—Charles Sukalo
Attorneys—John E. McRae, Tennes I. Erstad and Robert G. Crooks ABSTRACT: An electric plugboard-relay assembly for converting a heating furnace into a combination heating and cooling air conditioner. The plug board is associated with a junction box in the furnace. The relay is provided with prong-type leads which plug into the board to enable the furnace to electrically connect with the compressor of a refrigerating system, thereby adapting the furnace for both heating and cooling.

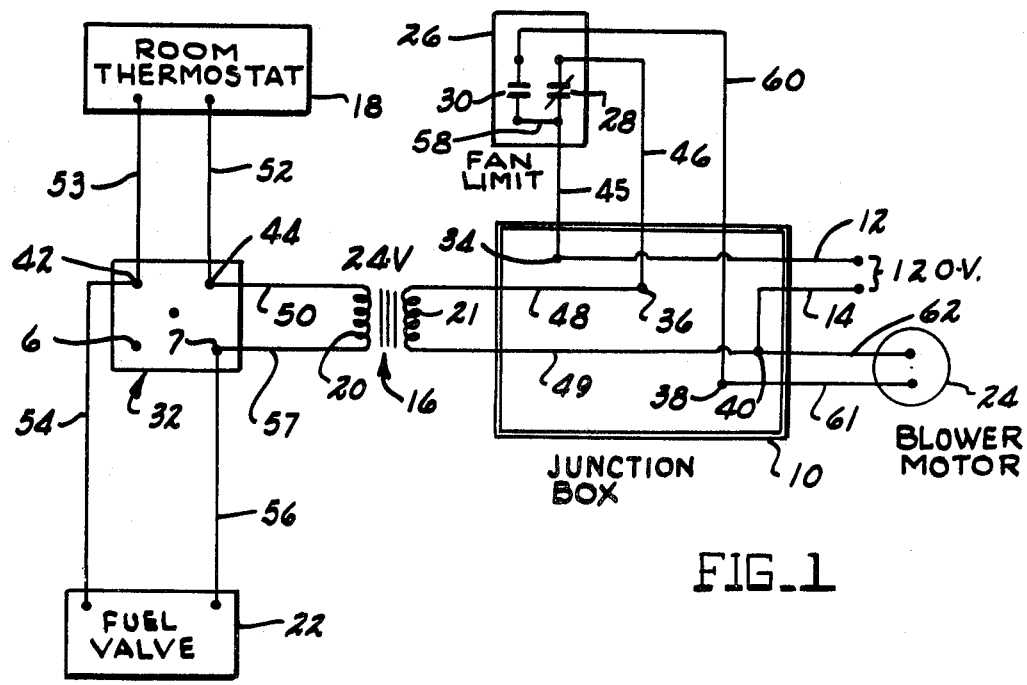
FIG_1
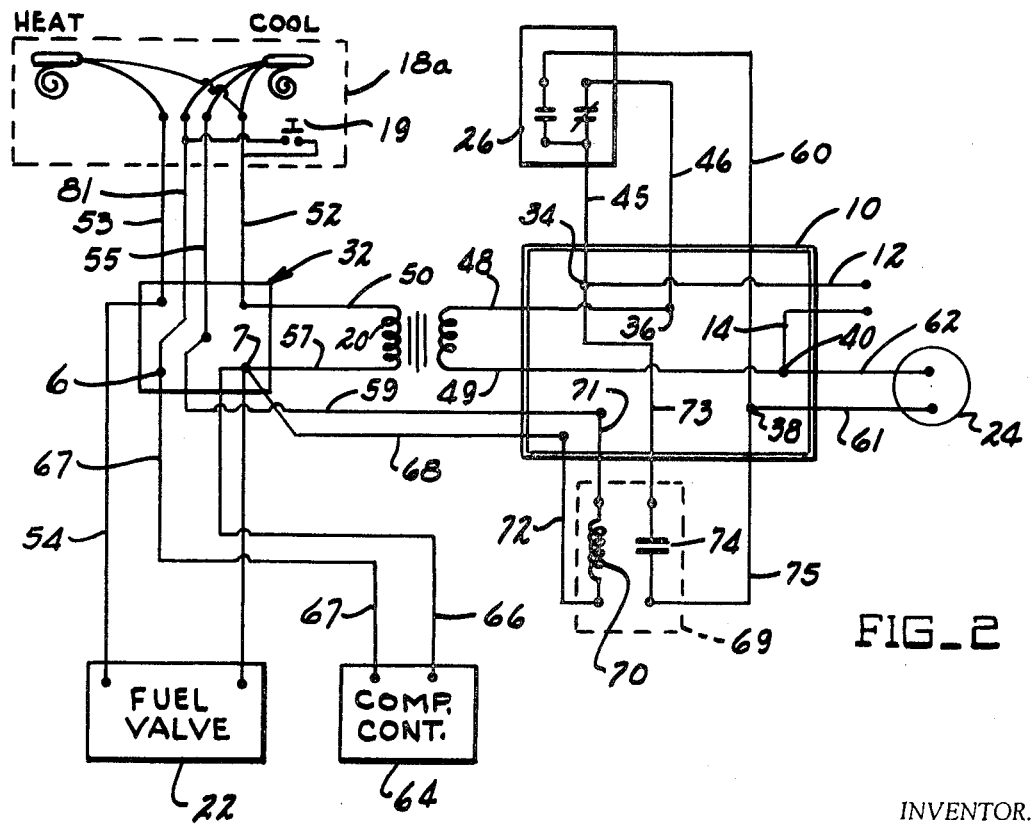
FIG_2
INVENTOR.
DONALD N. JOSLIN

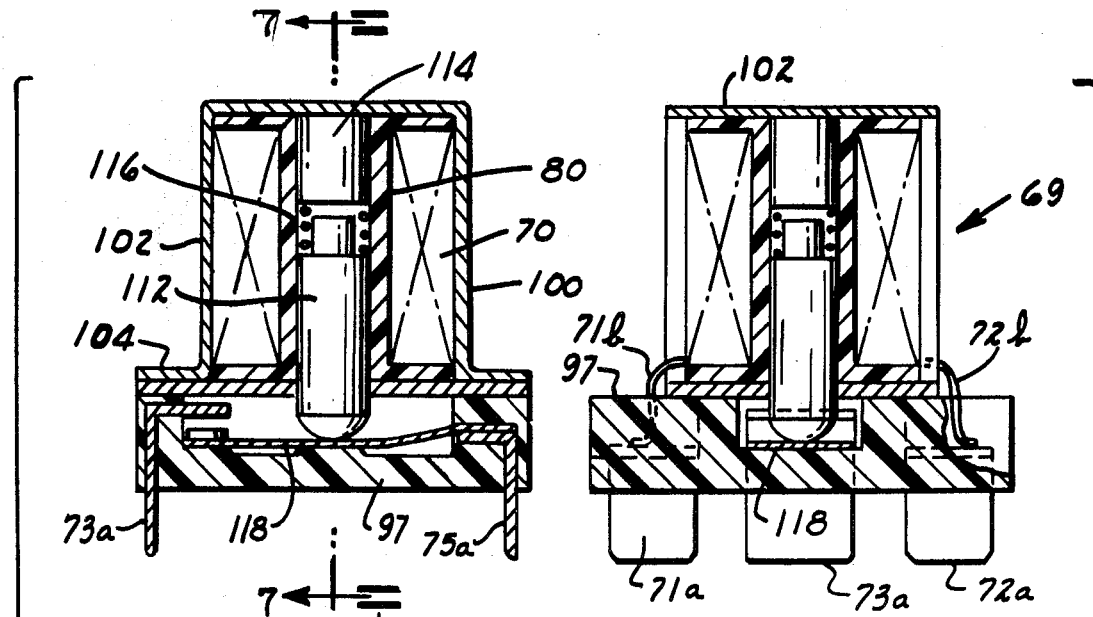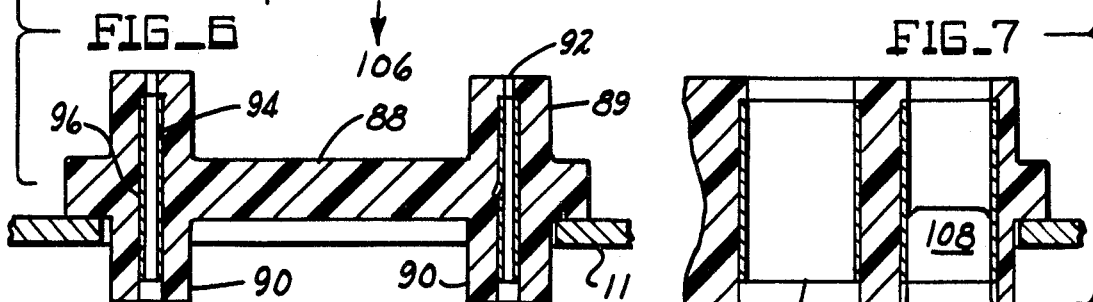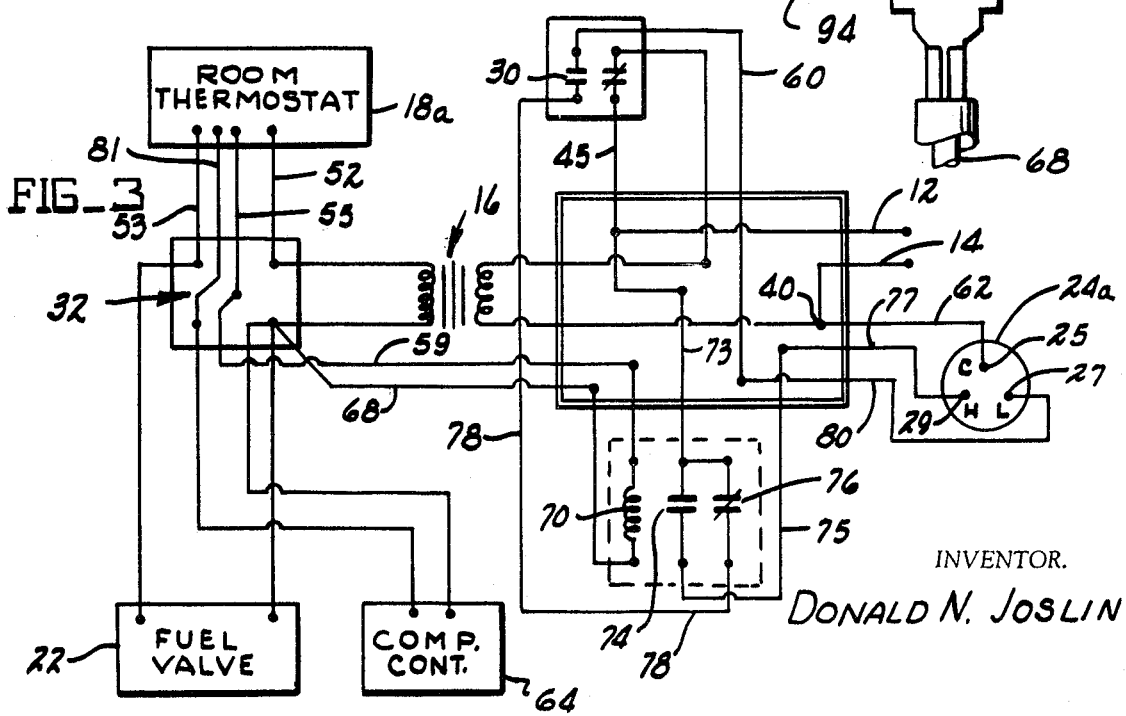

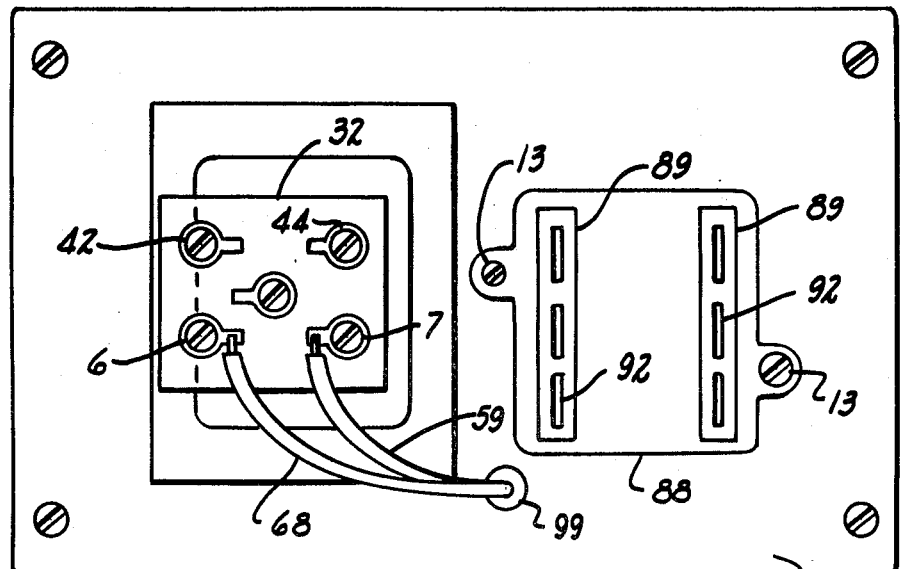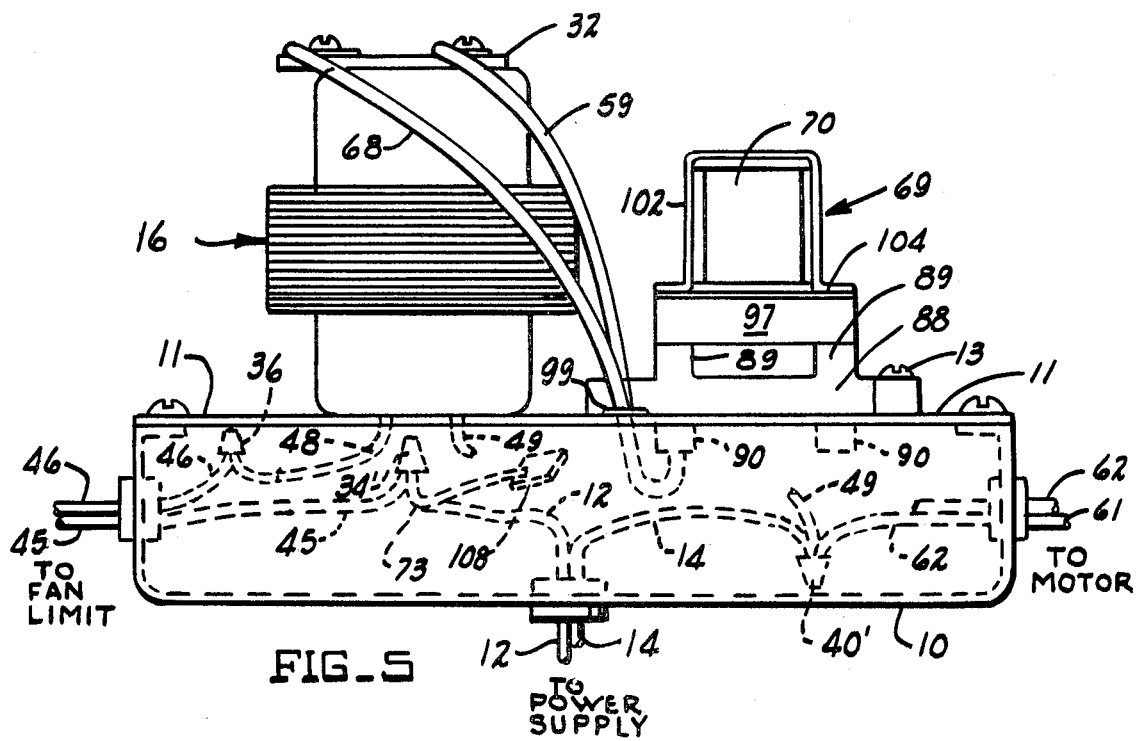

3,599,710

RELAY-TYPE CONTROL FOR AIR CONDITIONER

THE DRAWINGS

FIGS. 1, 2, and 3 are circuit diagrams showing furnace control circuitry as used for a heat-only furnace and a heat-cool air conditioner assembly.

FIGS. 4 and 5 are plan and side views of a junction box-transformer-plugboard-relay assembly utilizing the circuitry of FIGS. 1 and 2.

FIGS. 6 and 7 are sectional views taken through the relay and plugboard of FIG. 5.

FIG. 1 CIRCUITRY

FIG. 1 illustrates an electric circuit for controlling a residential hot air furnace, said circuit including a conventional junction box 10 located within the furnace casing. Electrical power is supplied from lines 12 and 14 for energizing the step-down transformer 16 when the conventional room thermostat 18 calls for heat. The room thermostat is connected with the transformer low voltage winding 20 and the solenoid portion of a fuel gas valve 22 so that a call for heat by the thermostat completes an electrical circuit through the fuel valve solenoid and transformer winding 20, thus firing the burner and producing useful heat, as under conventional practice. The air to be heated is conveyed across the furnace heat exchanger by means of a conventional blower which is powered by a single-speed electric motor 24.

To control the motor 24, prevent excessive heatup of the furnace heat exchanger, and avoid cold drafts or abnormally hot air blasts in the rooms it is common practice to utilize a fan limit control 26 in the bonnet of the furnace. The fan limit includes a thermally responsive device, usually a bimetal, which responds to the treated air temperature in the bonnet to actuate the switches 28 and 30. At low temperature, as for example below 100° F., switch 28 is closed and switch 30 is opened. Should the bonnet temperature increase above the 100° F. setting the temperature-responsive switch 30 will be closed by the bimetal; high limit switch 28 will remain closed. Should the bonnet temperature increase to a dangerously high value as for example 160° F., the bimetal will cause high limit temperature-responsive switch 28 to open; switch 30 will remain closed.

Operation of the FIG. 1 circuitry involves a call for heat by room thermostat 18, i.e. a closure of the thermostat contacts. A circuit is thereby completed through winding 20, leads 50 and 52, thermostat 18, leads 53 and 54, valve 22, and leads 56 and 57. The energization circuit for primary winding 21 comprises leads 12 and 45, switch 28, leads 46 and 48, winding 21, and leads 49 and 14. Energization of these circuits caused fuel valve 22 to fire the furnace burner for the production of useful heat.

When the burner has opened long enough to raise the bonnet temperature to close switch 30 the blower motor 24 is energized through a circuit which includes leads 12 and 45, jumper 58, switch 30, leads 60 and 61, the motor, and leads 62 and 14. Should the bonnet temperature increase to a dangerously high value sufficient to open switch 28, the energization circuit for the transformer primary 21 will be interrupted, thus closing the fuel valve 22 and deenergizing the burner; the blower motor 24 will however remain energized through the circuit comprising fan switch 30. The blower can thus drive cool air through the furnace to reduce the temperature.

FIG. 2 CIRCUITRY

The above circuit is generally conventional and representative of a satisfactory method of controlling a residential furnace. FIG. 2 illustrates the FIG. 1 circuit with a relay 69 added to adapt the circuit for controlling a combination furnace and air conditioner. The air conditioner or air cooler portion conventionally comprises a refrigeration machine having a motor-driven compressor, refrigerant condenser and refrigerant evaporator arranged in series flow relation. The evaporator is usually located in an air duct immediately downstream from the furnace bonnet to thus cool the air being moved through the inactive furnace by blower 24.

The refrigerant compressor may be controlled by a low voltage relay-type control 64 having leads 66 and 67 suitably connected to the terminals 6 and 7 on the transformer terminal board 32. Control 64 may be energized by a circuit which includes a conventional heating-cooling thermostat 18a. Thermostat 18a may be provided with a single bimetal or two separate bimetals arranged so that different ones of the leads are connected together to initiate the heating and cooling cycles. To initiate a heat cycle leads 52 and 53 are connected together. To initiate a cooling cycle lead 52 is connected both to lead 81 and to lead 55. Lead 81 current energizes the compressor control 64, and lead 55 current energizes the relay coil 70, as will be apparent.

As schematically shown in FIG. 2, room thermostat 18a comprises two separate bimetals, each serving to operate a tiltable mercury switch; also included is a manual normally open switch 19 which bypasses one of the switches.

During the heating season the left bimetal causes its switch to complete a circuit across lines 52 and 53 for thus opening fuel valve 22; this is the same action as with the FIG. 1 circuit. During the cooling season the right bimetal senses a demand for cooling by causing its switch to complete a first coil 70 energizer circuit across lines 52 and 53, and a second compressor energizer circuit across lines 52 and 81.

The coil 70 energizer comprises leads 50 and 52, the mercury switch, leads 55, 59 and 71, coil 70, leads 72, 68 and 57, and transformer secondary 20. The compressor energizer circuit comprises leads 50 and 52, the mercury switch, leads 81 and 67, control 64, leads 66 and 57, and transformer secondary 20.

Energization of control 64 produces vaporization of refrigerant in the evaporator and consequent cooling of the bonnet air. Energization of the relay coil 70 energizes blower motor 24, thereby causing the cooled air to be circulated through the rooms. The motor 24 energization circuit comprises leads 12 and 73, relay switch 74, leads 75 and 61, motor 24, and the leads 62 and 14. This circuitry ensures that blower motor 24 will be energized on the cooling cycle only by a call for cooling from thermostat 18a, i.e. current flow across lines 52 and 55.

In normal heating periods the relay 69 has no effect on the blower motor and fuel valve during the heat cycle, i.e. the furnace operates as described in connection with FIG. 1. The blower may at any time be operated by manually closing a fan switch 19 in thermostat 18a, as when it is desired to provide air movement for filtering or odor removal without heating or cooling. Switch 19 closes the circuit across lines 52 and 55 to thus energize coil 70 and allow motor current to flow across contacts 74.

FIG. 3 CIRCUITRY

The circuitry of FIG. 2 provides the same blower motor 24 speed during the heating and cooling cycles. Better operation however is sometimes achieved when the blower motor operates at a higher speed for the cooling cycle then for the heating cycle. FIG. 3 illustrates a control circuit useful for achieving a higher blower speed during the cooling cycle then for the heating cycle. The blower motor 24a may be a multispeed motor of the permanent split-capacitor-type having a common terminal 25, a low-speed terminal 27, and a high-speed terminal 29. During the heating cycle the transformer 16 and the low voltage components, including coil 70 and control 64, are energized by the same mechanisms and circuitry as in FIG. 2. Motor 24a is however energized in a slightly different manner.

On the heating cycle the motor 24a is energized for low-speed rotation by a circuit which comprises leads 12 and 73, relay switch contacts 76, and 78, switch 30, leads 60 and 80, the lowcspeed motor windings, and leads 62 and 14. Switch 76 and lead 78 cooperatively substitute for jumper 58 used in FIG. 1.

On the cooling cycle the motor 24a is energized for high-speed rotation by a circuit which comprises leads 12 and 73, switch 74, leads 75 and 77, the high-speed motor windings, and leads 62 and 14.

COMPARISON OF THE CIRCUITS

It will be noted that in FIG. 2 circuitry differs from the FIG. 1 circuitry in that a relay 69 is added into the circuitry, a different-type room thermostat is employed, and compressor control lead wires are added. Circuitry lead wiring for the room thermostat and compressor control is installed in the field, and thus has no effect on manufacturing methods or constructions employed at the factory. However some factory-manufacturing economies can be obtained by the way in which relay 69 is constructed and connected to the junction box wiring, the transformer wiring. The present invention proposes an improved circuit board-relay assembly which permits the FIG. 1 heating control circuit to be quickly converted to the FIG. 2 heating-cooling control circuit merely by manual plug-in of the relay onto the board. Attainment of the FIG. 3 multiblower speed control circuit requires certain added steps such as replacing the blower motor, adding motor lead wiring, and utilizing a different relay.

FIGS. 4 AND 5

There is shown a conventional junction box 10 having leads therein suitably connected by wire nuts, two of which are shown at 34' and 40'. The numerology corresponds to that shown in FIGS. 1 and 2. The high voltage wiring is contained within the box 10 by means of a conventional cover 11 which also functions as a mounting means for transformer 16. The high voltage lead wires 48 and 49 may be run into the box through holes in cover 11; the transformer overlies such holes.

The transformer is equipped with a terminal board 32 for connecting the transformer secondary with the remotely located room thermostat 18 or 18a, the fuel valve 22, and the compressor control 64. Leads 68 and 59 (see FIGS. 2 and 3) may be run through a grommet 99 in cover 11 and thence into the box as shown in FIG. 5.

Located alongside the transformer is a plugboard 88 intended to detachably receive the relay 69. The relay is shown in FIG. 5, but is removed from FIG. 4 to better show the outline of board 88. The board comprises a dielectric plastic molding 88 secured to the junction box cover 11 by a pair of screws 13. The board is provided with two raised areas 89 facing the exterior of the box and the two similar raised areas 90 facing the interior of the box; a suitable rectangular opening 91 (see FIG. 6) is provided in the junction box cover to accommodate the raised portions 90. As shown in FIG. 4, the raised portions are provided with a multiplicity of slotlike rectangular passages 92. These passages contain electrical connectors which make electrical contact with prong-type leads on the plug-in relay 69, as better shown in FIG. 6 and 7.

FIGS. 6 and 7

FIG. 6 shows each electrical connector 94 as a length of metallic tubing. Various different connector constructions can be employed in the practice of the invention, including spring fingers, leaf arms etc. Each connector can be anchored in the passage 92 by positioning same as an insert in the molding operation, or by forming the connector with barbed portions 96 and manually forcing the connector into the passageway after formation of the plugboard. The exact construction of the connector is not part of the present invention.

The locations of the electric connectors 94 are such that prong-type leads or plugs can be inserted from the exterior of the box into the connectors, and other prong-type leads or plugs can simultaneously be inserted into the connectors from within the box interior. This arrangement enables the relay 69 to be plugged into the board from the box exterior, and also enables wiring within the box to be electrically plugged into the connectors and thus onto the relay leads.

One suitable form of relay is schematically shown in FIGS. 6 and 7. As there shown, the relay comprises a molded plastic base 97 having spadelike terminals 71a, 72a, 73a and 75a suitably mounted therein, as by locating same as inserts during the molding operation. The various terminals are referenced to correspond with the FIG. 2 numerology in order to relate to FIGS. to one another.

The relay winding comprises a coil 70 suitably wound on a dielectric spool 80 and mounted within a ferromagnetic frame 100 comprised of a U-shaped strap 102 and flat plate 104, suitable rivets, screws, etc. (not shown) being provided to connect the frame elements to one another and to the plastic base 96. The wire coil ends 71b and 72b may be soldered to the prongs 71a and 72a to electrically connect the coil to the prong-type leads. Preferably the base is recessed on its upper face to expose the terminals for soldering. It will be seen that when the relay is plugged onto the board (by movement thereof in the arrow 106 direction) the coil 70 will be electrically connected into any circuit wires in the junction box which have been plugged into the connectors 94 from within the box.

Coil 70 encircles a plunger-type armature 112 arranged for axial slidable movement toward and away from a pole piece 114. When the coil is energized armature 112 moves upwardly to engage pole piece 114, thereby permitting the switch leaf 118 to snap upwardly and thus make electric contact with the terminal 73a. Deenergization of the coil allows the spring 116 to force armature 112 to move the leaf 118 down to its illustrated position for opening the circuit across terminals 73a and 75a.

The relay construction is shown in a semidiagrammatic manner, and variations in manufacture may be resorted to without departing from the general concept, which is to provide a relay which can be plugged into a circuit board to automatically convert a furnace from heat-only furnace to a combination furnace-air conditioner. The ultimate aim is to reduce the inventories of junction boxes, relays etc. necessary for a range of models, to reduce the retailer's inventory costs, to standardized and economize on manufacturing operations by utilizing as much as possible a common method of assembly of the circuitry at the factory, and to facilitate field wiring during the addition of air conditioning to existing furnaces.

I claim:

1. In a heating-cooling furnace control comprising power supply wiring; a heating-cooling thermostat energized by the power supply wiring; a heat producer electrically wired to the heating portion of the thermostat for heating the furnace air when the thermostat senses a demand for heat; a fan for moving air through the furnace; an air cooler electrically wired to the cooling portion of the thermostat for cooling the furnace air when the thermostat senses a demand for cooling; and an air-temperature-responsive switch wired to the fan for energizing same when the air is heated to a predetermined temperature: the improvement comprising a fan energizer relay having a control winding wired to the cooling portion of the thermostat for energization when the thermostat senses a demand for cooling, and winding-controlled switch means wired to the fan in parallel with the aforementioned air-temperature-responsive switch, whereby the fan is controlled by the air-temperature-responsive switch during the heating season and by the relay during the cooling season; a furnace junction box operably receiving therewithin the power supply wiring, the air-temperature-responsive switch wiring, the relay wiring, and the fan wiring; a plug-on connector board carried on the junction box for operably mounting the fan energizer relay; said connector board having individual electrical connector surfaces exposed to the junction box interior and exterior, and the junction box interior wiring having terminal ends attached directly to selected ones of said connector surfaces; the aforementioned relay having rigid terminals for its winding and its switch means; said relay terminals being spaced from one another in accordance with the spacing of the board connector surfaces, whereby the relay can be plugged onto the board so that the relay terminals electrically connect with selected ones of the connector surfaces.

2. The furnace control of claim 1 wherein the junction box is provided with a cover, and the plug-on connector board is mounted on the cover, whereby the box interior wiring can be attached to the connector surfaces with the cover partially removed from the box, after which the cover-board assembly can be secured to the box to conceal and shield the box wiring.

3. The furnace control of claim 1 wherein the board connector surfaces consist of electrical sockets, and the junction box wiring terminal ends consist of male prongs insertable into selectable ones of the sockets.

4. The furnace control of claim 1 wherein the board connector surfaces consist of electrical sockets, and the relay terminals consist of male prongs projecting from the relay body for insertion into the sockets.

5. In a heating-cooling furnace control comprising power supply wiring; a stepdown transformer energized by said power supply wiring; a heating-cooling thermostat electrically wired to the transformer secondary; a heat producer electrically wired to the heating portion of the thermostat for heating the furnace air when the thermostat senses a demand for heat and the transformer primary is energized; a fan electrically wired to the transformer primary for moving air through the furnace; an air cooler electrically wired to the cooling portion of the thermostat for cooling the furnace air when the thermostat senses a demand for cooling; and an air-temperature-responsive switch wired to the fan for energizing said fan when the air is heated to a predetermined temperature: the improvement comprising a fan energizer relay having a control winding wired to the cooling portion of the thermostat for energization thereby when the thermostat senses a demand for cooling, and winding-controlled switch means wired to the fan in parallel with the aforementioned air-temperature-responsive switch, whereby the fan is controlled by the air-temperature-responsive switch during the heating season and by the relay during the cooling season; a furnace junction box operably receiving therewithin the power supply wiring, the fan wiring, and the transformer primary wiring; a plug-on connector operably mounting the fan energizer relay; said transformer, junction box and connector board being physically associated with one another as a centrally located assembly within the furnace; said connector board having individual connector surfaces exposed to the junction box interior and exterior, and the junction box wiring having terminal ends attached directly to selected ones of said connector surfaces; the aforementioned relay having rigid terminals for its winding and its switch means; said relay terminals being spaced from one another in accordance with the spacing of the plug-on board connector surfaces whereby the relay can be plugged onto the board so that the relay terminals electrically connect with selected one of the connector surfaces.

6. The furnace control of claim 5 wherein the junction box is provided with a cover, and the board and transformer are mounted thereon; the box wiring being of sufficient length as to be attachable to the board connector surfaces with the cover partially removed from the box; said cover substantially completely closing the box to conceal and shield the box wiring.

7. The furnace control of claim 6 wherein the transformer is mounted on the outside face of the cover, said transformer having primary lead wiring extending into the box through an opening in the cover, said transformer overlying the cover opening to shield the lead wiring.

8. The furnace control of claim 7 wherein the transformer is provided with an external terminal board for lead wire connections to the thermostat, heat producer, and air cooler; the transformer secondary being connected to the relay winding via flexible lead wires extending from the terminal board into the box through a second opening in the cover.

UNITED STATES PATENT OFFICE
CERTIFICATE OF CORRECTION

Patent No. 3,599,710              Dated August 17, 1971

Inventor(s) Donald N. Joslin

It is certified that error appears in the above-identified patent and that said Letters Patent are hereby corrected as shown below:

Column 6, line 5, after "wiring", first occurrence, insert -- the air-temperature-responsive switch wiring, the relay wiring, --; line 6, after "connector" insert -- board --.

Signed and sealed this 14th day of March 1972.

(SEAL)
Attest:

EDWARD M. FLETCHER, JR.                 ROBERT GOTTSCHALK
Attesting Officer                       Commissioner of Patents